(12) United States Patent
Albrecht et al.

(10) Patent No.: US 7,355,141 B2
(45) Date of Patent: **\*Apr. 8, 2008**

(54) WELDER WITH INTEGRATED REGULATOR

(75) Inventors: Bruce Albrecht, Hortonville, WI (US); Tim A. Matus, San Antonio, TX (US); Bernard J. Vogel, Troy, OH (US); Ken Stanzel, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 484 days.

This patent is subject to a terminal disclaimer.

(21) Appl. No.: 10/707,411

(22) Filed: Dec. 11, 2003

(65) Prior Publication Data
US 2005/0127043 A1    Jun. 16, 2005

(51) Int. Cl.
*B23K 9/16* (2006.01)
(52) U.S. Cl. .................................................... 219/74
(58) Field of Classification Search ................. 219/74, 219/136, 130.1
See application file for complete search history.

(56) References Cited

U.S. PATENT DOCUMENTS 3,275,796 A * 9/1966 Bernard et al. ........ 219/137.71
5,472,024 A 12/1995 Brugerolle et al.
6,707,004 B2 * 3/2004 Matiash et al. .......... 219/137.2
6,977,358 B2 * 12/2005 Albrecht et al. ......... 219/130.1
7,015,412 B1 * 3/2006 Uttrachi ....................... 219/74

FOREIGN PATENT DOCUMENTS

| DE | 83 08 999.3 U | 11/1983 |
| JP | 60-64769 A | 4/1985 |
| JP | S60-64769 | 4/1985 |

OTHER PUBLICATIONS

Translation of DE 83 08 999.3-U, Nov. 24, 1983.

* cited by examiner

*Primary Examiner*—Kevin P. Kerns
(74) *Attorney, Agent, or Firm*—Ziolkowski Patent Solutions Group, SC

(57) ABSTRACT

A welder having an internal shielding gas regulator is disclosed. The welder has an internal gas cylinder and an internal regulator disposed in an enclosure. The welder may be equipped with an auxiliary shielding gas cylinder inlet so that a bulk shielding gas cylinder can be attached thereto and have a flow therefrom regulated by the internal shielding gas regulator. The welder constructed according to the invention is highly transportable, compact, and self-sufficient.

25 Claims, 2 Drawing Sheets

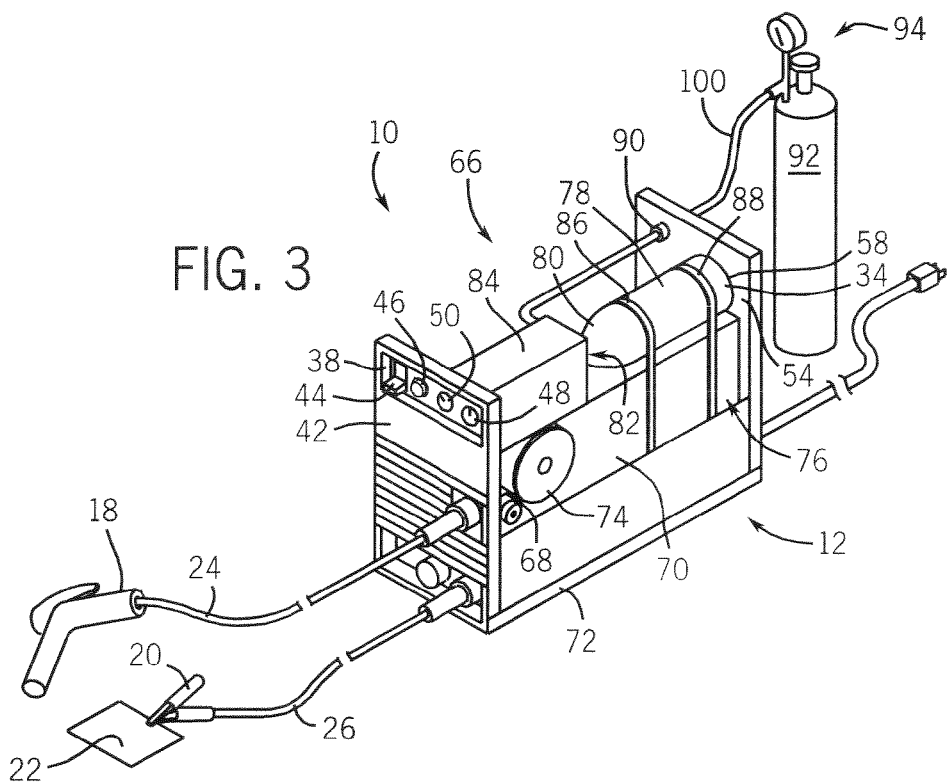
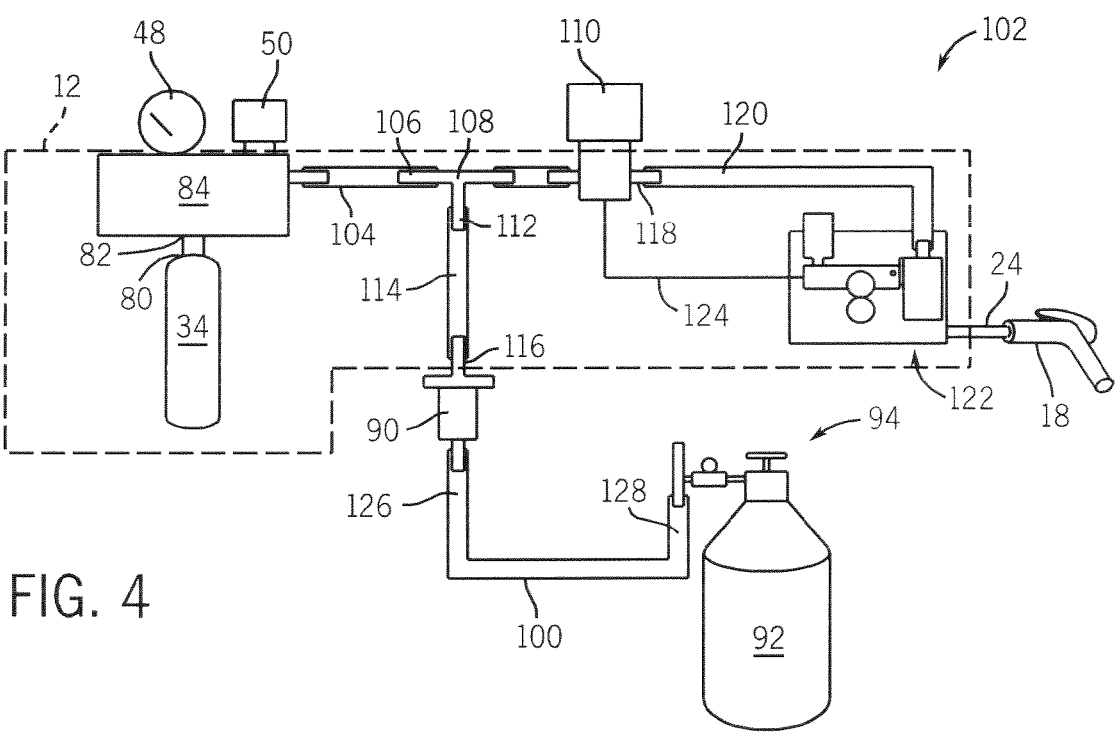

ID REGULATOR

BACKGROUND OF INVENTION

The present invention relates generally to welding systems and, more particularly, to a welder having an integrated regulator.

Welder power sources have become increasingly portable in recent years. This portability is largely the result of lighter unit weight and improved electrical components. One advancement in the area of electrical components has been the incorporation of inverter-type power sources. The application of an inverter power source has reduced the size and weight of welders and created usable space within the confines of the housing, while maintaining the ability to generate the outputs required for welding. Similarly, advances in battery technology allow the incorporation of an energy storage device in a welder to allow easy transport.

Improvements in wire feeder technology have also improved the ease of use and portability of a welder. Gas metal arc welding (GMAW) is becoming more widely accepted, and provides cleaner welds by less experienced welders. As a result, due to the ease of use and versatility of application, many users prefer gas metal arc welding over conventional stick welding.

Space in any work environment is always at a premium. Whether the welder is used in the hobbyist's garage or the machine shop of an industrial plant, the size of the unit is always a design consideration. The space used by a welder is not limited to the dimensions of the power source itself but includes the ancillaries related to welding processes such as cables, consumables, gas cylinders, and regulators. The space required for the storage and maintenance of these items is another consideration associated with many welders.

Shielding gas cylinders provide an inert gas to the welding process. This inert gas encapsulates the welding process in order to protect the integrity of the weld from contaminants and also enhances arc performance during a welding process. The shielding gas is generally provided in very large and very heavy cylinders. The flow from these cylinders to the welder is generally controlled by a regulator. The regulator generally has a valve used to control the flow of gas from the cylinder and a gauge used to determine the amount of gas left in the cylinder. The regulator is attached to the cylinder which is usually located behind the welder. Such a location leaves the regulator susceptible to the accumulation of dirt and debris associated with the welding process as well as placing access to the valve and gauge away from the control panel when located on or near the bottle.

The size and weight of the gas cylinders significantly detracts from the portability of the welder. Additionally, moving the welder with the gas cylinder and regulator removably attached thereto presents an opportunity for inadvertent damage to the regulator. The position of the regulator, at the top of the gas cylinder, and the awkward shape of the combination, is detrimental to portability and can be a reason for advanced wear or damage of the regulator.

It would therefore be desirable to design a welding-type system and method that includes internal regulation in the housing of the welder power source.

BRIEF DESCRIPTION OF INVENTION

The present invention is directed to a welder that solves the aforementioned drawbacks. The present invention provides a system and method for a welder that is portable and includes a regulator therein. The regulator is constructed to engage a shielding gas cylinder and provides user control of the regulator from a location outside of the power source.

Therefore, in accordance with one aspect of the present invention, a welding-type apparatus has a power source constructed to output an electrical signal suitable to welding and a shielding gas regulator disposed within an enclosure. The shielding gas regulator contained within the enclosure is constructed to deliver a shielding gas from a gas cylinder to a weld. Such a construction provides readily accessible control, protects the shielding gas regulator from dirt and debris associated with the welding environment, and improves the portability of the welding-type power source.

In accordance with another aspect of the present invention, a welding-type device has a base and a cover forming a housing with a welding power source disposed therein. The welding power source is constructed to generate a signal suitable to welding. A first gas path, constructed to provide shielding gas to a weld, originates at a regulator and is located within the housing. The welding-type device has a second gas path also constructed to provide shielding gas to a weld. Such a construction allows for two gas cylinders to be connected to the welding-type device concurrently, thereby improving the versatility of the welding-type device.

In accordance with a further aspect of the present invention, a method of constructing a welding-type apparatus includes providing a power source constructed to provide a signal suitable to welding, a regulator constructed to engage a welding gas cylinder, and enclosing the power source and the regulator in a common enclosure. Such a construction provides improved portability of the welding-type device.

Therefore, the present invention provides a welder with a shielding gas regulator housed therein. Such a construction allows for a welding-type power source that is lightweight and transportable with a regulator securely housed therein.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 3 is a perspective view of the alternative embodiment of the power source of FIG. 1 with the cover removed.

FIG. 4 is a schematic representation of the shielding gas supply system of the power source shown in FIG. 1.

DETAILED DESCRIPTION

As one skilled in the art will fully appreciate, the hereinafter description of welding devices not only includes welders but also includes any system that requires high power outputs, such as heating and cutting systems, that require regulated flows of a shielding gas. Description of a welding-type apparatus illustrates just one embodiment in which the present invention may be implemented.

Figure 1:
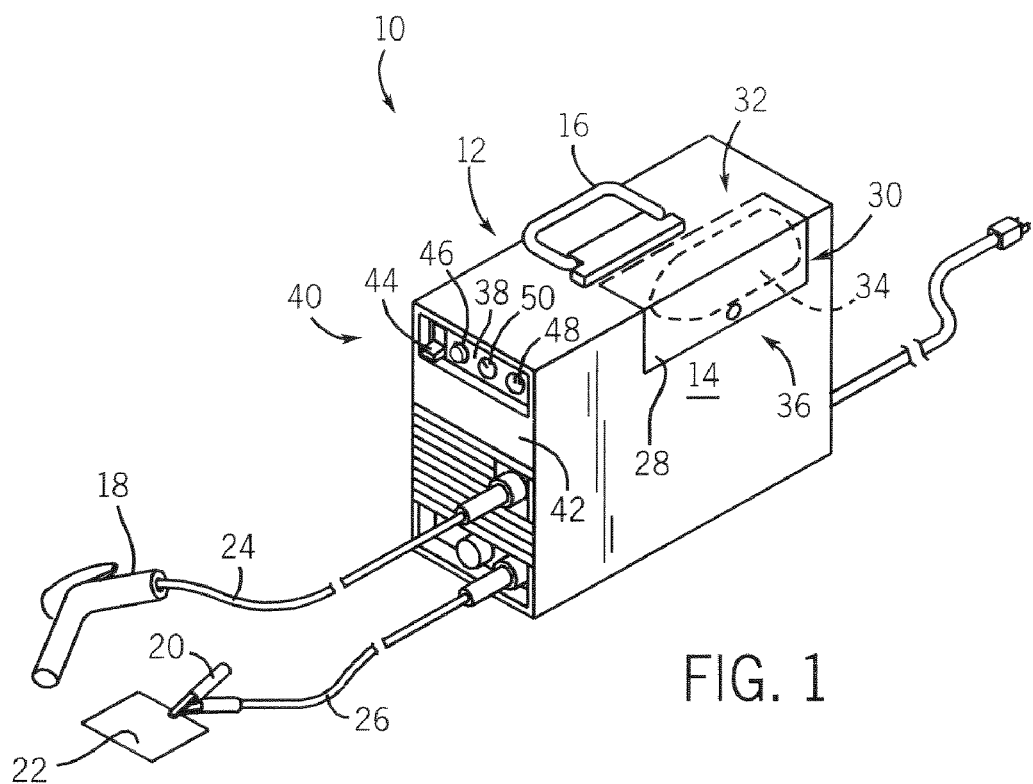
FIG. 1 is a perspective view of the power source according to the present invention.

Referring now to FIG. 1, a perspective view of a welding device incorporating the present invention is shown. Welding device 10 includes a housing 12 enclosing the internal components of the welding device under a cover 14. Optionally, the welding device 10 includes a handle 16 for transporting the welding system from one location to another. To effectuate the welding process, such as TIG or MIG welding, the welding device includes a torch 18 as well as a work clamp 20. The work clamp 20 is configured to ground a workpiece 22 to be welded. As is known, when the torch 18 is in relative proximity to workpiece 22, a welding arc or cutting arc results, depending upon the particular welding desired. A pair of cables 24 and 26 connects the torch 18 and work clamp 20 to the housing 12, respectively.

As shown in FIG. 1, cover 14 has a door 28 located therein which allows access to an interior of welding device 10. Door 28 covers an opening 30 in housing 12 and has a hinge 32 connecting door 28 thereto. Opening 30 is configured to allow for the passage of an internal shielding gas cylinder 34 (shown in phantom under cover 14) therethrough. Hinge 32 of door 28 allows door 28 to be pivotally opened and closed over opening 30. The hinge may also be placed on a bottom side 36 of door 28.

A control panel 38 is located in an upper portion 40 of a front panel 42 of housing 12. An on/off switch 44 and an output power control 46 are also located in control panel 38 of front panel 42. It is understood that output control 46, although shown as a single variable control, could be configured as several independent controls to control variable parameters of the power source such as wire feed speed, voltage, or current. A pressure gauge 48 and a valve 50 are located in control panel 38 of front panel 42 and provide an operator with a means of readily determining and controlling shielding gas flow to torch 18.

Figure 2:
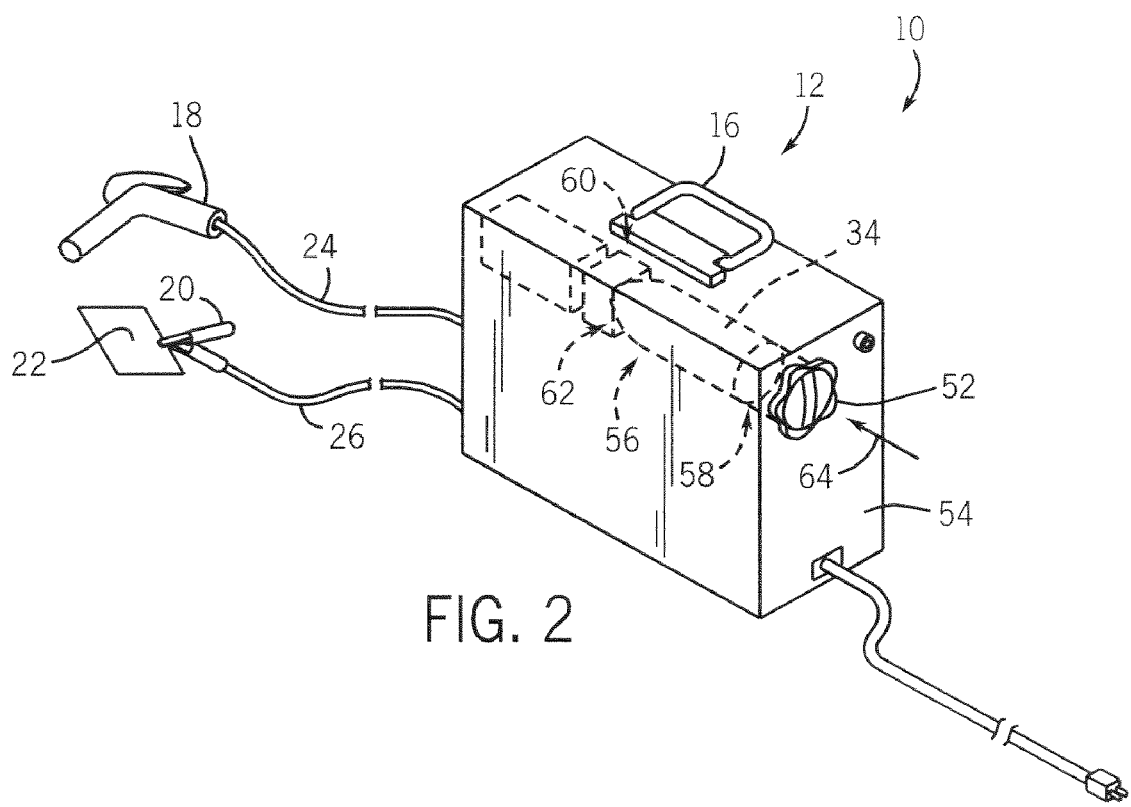
FIG. 2 is a perspective view of an alternative embodiment of the power source of FIG. 1.

FIG. 2 shows an alternate embodiment of the opening for the internal shielding gas cylinder 34. Preferably, a cover 52 threadingly engages a rear panel 54 of housing 12. Cover 52 is removable to allow for placement of internal shielding gas cylinder 34 into a gas cylinder chamber 56. Cover 52 can be constructed to retain a base 58 of internal shielding gas cylinder 34. In this manner, a support 60 is provided at a front end 62 of gas cylinder chamber 56 and internal shielding gas cylinder 34 is effectively retained between support 60 and cover 52. Although shown as positioned in a rear or a side panel of the housing, such openings are only by way of example and do not limit the scope of the claims presented herein.

FIG. 2 also shows a first embodiment of a means of retaining the gas cylinder in welder 10. Cover 52 extends into an interior of welding device 10 by extending past rear panel 54. Cover 52 is constructed to engage base 58 of internal shielding gas cylinder 34 and thereby creates a compressive force generally indicated by arrow 64 between support 60 and rear panel 54 of housing 12 with internal shielding gas cylinder 34 disposed therebetween. The construction of support 60 and cover 52 secure internal shielding gas cylinder 34 relative to a power source within housing 12 of welder 10. Although not shown in FIG. 2, it is understood that the control panel 40 of this embodiment is similar to the control area shown in FIG. 1. That is, regardless of the means for providing shielding gas to the torch, by positioning the valve and gauge of a shielding gas regulator in the general vicinity of the control panel of the welding-type device, an operator has ready access to the control and operation of the shielding gas from a convenient location.

FIG. 3 shows a detailed view of the embodiment of FIG. 1 with cover 14 removed to expose an interior 66 of welding device 10 and having connected thereto an optional secondary source of welding gas 92. A wire feeder 68 is disposed in interior 66 of welding device 10 and in electrical communication with a power source 70, also located therein and attached to a base 72 of housing 12. Wire feeder 68 provides a consumable material, such as wire 74, to torch 18 during the welding process. Shielding gas is provided to torch 18 during the welding process from internal shielding gas cylinder 34. An operator can monitor and control the flow of shielding gas delivered to torch 18 by adjusting valve 50 and monitoring gauge 48 located in control panel 38 of front panel 42.

Internal shielding gas cylinder 34 is located within housing 12 of welding device 10 and held in place by a means for retaining the gas cylinder, in this embodiment, a restraint 76. Restraint 76 maintains the position of internal shielding gas cylinder 34 relative to power source 70. A body 78 of internal shielding gas cylinder 34 extends between base 58 and an outlet end 80. Outlet end 80 of internal shielding gas cylinder 34 is constructed to engage a first adapter 82 of an internal regulator 84. The means for retaining 76 can be of many different configurations such as that shown with reference to FIG. 2, as discussed above, or, as that shown in FIG. 3, a pair of straps 86, 88 that hold body 78 of internal shielding gas cylinder 34 and prevent movement of internal shielding gas cylinder 34 relative to power source 70 and internal regulator 84. Such a construction prevents the inadvertent disengagement of internal shielding gas cylinder 34 from first adapter 82 of internal regulator 84.

Also shown in FIG. 3, first adapter 82 of internal regulator 84 is constructed to engage outlet end 80 of internal shielding gas cylinder 34 inside housing 12 and still allow a user control over the function of internal regulator 84. Gauge 48 and valve 50 extend from internal regulator 84 through front panel 42 of housing 12. Valve 50 and gauge 48 allow a user to adjust and determine the delivery pressure of shielding gas to torch 18 from internal shielding gas cylinder 34 and are positioned in control panel 38 of front panel 42 so that a majority of the controls of the welding-type device, including the control of the delivery pressure of the shielding gas, are adjustable from the control panel 38 of device 10. In addition to first adapter 82, internal regulator 84 is also connected to a housing adapter 90, which is discussed below.

Housing adapter 90 extends from internal regulator 84 through rear panel 54 of housing 12 and is constructed to engage optional secondary source of welding gas 92. Optional secondary source of welding gas 92 also has a regulator 94 attached thereto. A connection means 100 extends from regulator 94 to housing adapter 90 of welding device 10. This construction provides for the connection of a second shielding gas cylinder to the welding device when desired, such as when the welder is located at a primary operating position such as a shop or a garage. Additionally, this construction provides that the shielding gas cylinder located within the welding device is reserved for remote operations away from the bulk shielding gas cylinder. The construction also prevents excessive changing of gas cylinders when a bulk shielding gas cylinder is available. Additionally, the user is not required to transport a heavy and awkward bulk cylinder, but can simply disconnect the bulk cylinder at housing adapter 90 and move the welding-type device to a desired position with internal shielding gas cylinder 34 located securely within housing 12.

FIG. 4 shows a schematic representation of a shielding gas system 102 of the welding device 10 in accordance with one embodiment of the invention. Outlet end 80 of internal shielding gas cylinder 34 engages first adapter 82 of internal regulator 84. Pressure gauge 48 and control valve 50 of internal regulator 84 pass through housing 12 and indicate conditions of a shielding gas path 104. Shielding gas path 104 passes through a first inlet 106 of a T-connector 108 and into a valve 110. T-connector 106 has a second inlet 112 that is connected by a second gas path 114 to a nipple 116 of housing adapter 90. Valve 110 has an outlet 118 that is connected by a gas path 120 to a drive roll assembly 122. Drive roll assembly 122 is electronically connected 124 to control the on/off actuation of valve 110 such that shielding gas is provided when a trigger of torch 18 is activated. As such, valve 110 controls the flow of shielding gas to torch 18 from internal shielding gas cylinder 34 and optional secondary source of welding gas 92.

Housing adapter 90 extends through housing 12 and is rigidly mounted to housing 12. Housing adapter 90 also acts as a check valve and prevents the passage of shielding gas therethrough when a first end 126 of connector means 100 is not connected thereto. The engagement between housing adapter 90 and first end 126 of connection means 100 is such that the two components can be fluidly connected without needing additional tools. Such a connection is commonly referred to as a quick connection or a quick coupler. Connection means 100 has a second end 128 connected to secondary regulator 94 of optional secondary source of welding gas 92. This construction allows for quickly connecting and disconnecting optional secondary source of welding gas 92 from welding device 10. As such, when it is desired to utilize the welding device in a remote location away from such an auxiliary bulk shielding gas cylinder, connection means 100 and housing adapter 90 are disconnected at either of first or second ends 126, 128. The welding device can then be operated remotely with internal regulator 84 and internal shielding gas cylinder 34 to provide regulated shielding gas for welding. This construction provides that the gas cylinder located within the welding device is reserved for remote operations away from the bulk tank. By using the bulk shielding gas cylinder whenever available, replacing or refilling of the internal gas cylinder is minimized.

The invention can be used in any welding-type apparatus, and is especially applicable to TIG and/or MIG welding processes. It is also noted that the regulator may be used to control a flow of inert or another suitable gas/mixture suitable for such uses. In general then, the invention is applicable to any of the aforementioned welding-type applications that would benefit from an internally regulated shielding gas flow.

Therefore, in accordance with one embodiment of the present invention, a welding-type apparatus includes a power source constructed to output an electrical signal suitable to welding and a shielding gas regulator disposed within an enclosure.

In accordance with another embodiment of the present invention, a welding-type device has a housing having a base and a cover. A welding power source is disposed in the housing and is constructed to generate a signal suitable to welding. A first gas path originates at a regulator located in the housing and is constructed to provide shielding gas to a weld. The welding device has a second gas path that is also constructed to provide shielding gas to a weld.

In accordance with a further embodiment of the present invention, a method of constructing a welding-type apparatus is disclosed that includes providing a power source constructed to provide a signal suitable to welding, providing a regulator constructed to engage a welding gas cylinder, and enclosing the power source and the regulator in an enclosure.

The present invention has been described in terms of the preferred embodiment, and it is recognized that equivalents, alternatives, and modifications, aside from those expressly stated, are possible and within the scope of the appending claims.

What is claimed is:

1. A welding apparatus comprising:
   an enclosure;
   a power source constructed to output an electrical signal suitable to welding and disposed within the enclosure; and
   a shielding gas regulator disposed within the enclosure and fluidly connected to a first gas source via a gas path free of manually operated valve therebetween.

2. The welding apparatus of claim 1 wherein the first gas source is further defined as a gas cylinder, the gas cylinder connected to the shielding gas regulator and located at least partially within the enclosure.

3. The welding apparatus of claim 2 wherein the gas cylinder is disposable.

4. The welding apparatus of claim 2 further comprising a second gas cylinder connected to the shielding gas regulator and outside the enclosure.

5. The welding apparatus of claim 4 wherein the second gas cylinder is connected to the shielding gas regulator by a quick connector.

6. The welding apparatus of claim 1 further comprising an electric valve downstream of the shielding gas regulator that allows on/off flow therethrough.

7. The welding apparatus of claim 1 further comprising a valve attached to the shielding gas regulator and adjustable from within the enclosure.

8. A welding device comprising:
   a housing having a base and a cover;
   a welding power source disposed within the housing and constructed to generate a signal suitable for welding;
   a first gas path originating at a regulator located in the housing and constructed to provide a gas from a first source to a welding torch; and
   a second gas path constructed to provide gas from another source to a welding torch.

9. The device of claim 8 wherein the regulator further comprises a valve and a gauge accessible from one of inside and outside the housing.

10. The device of claim 8 further comprising a gas cylinder attached to the regulator in the first gas path and enclosed in the housing.

11. The device of claim 8 wherein the first gas path and second gas path intersect within the housing.

12. The device of claim 8 wherein the second gas path further comprises a connector extending through the housing and arranged to engage a gas cylinder.

13. The device of claim 10 wherein the connector is a quick connector.

14. The device of claim 8 further comprising an opening in the housing constructed to allow passage of a gas cylinder therethrough and into engagement with the regulator therein.

15. The device of claim 8 wherein the power source is at least one of an inverter, an energy storage device, and a combination of an inverter and an energy storage device constructed to output an electrical signal capable of welding.

16. A method of constructing a welding apparatus comprising:
providing a power source constructed to provide a signal suitable to welding;
providing a regulator constructed to engage a welding gas cylinder; and
enclosing the power source and the regulator in an enclosure such that the regulator is adjustable when the enclosure is closed.

17. The method of claim 16 further comprising passing a welding gas cylinder through an opening in the enclosure and into engagement with the regulator.

18. The method of claim 17 further comprising providing a valve downstream of the regulator that is electronically controlled.

19. The method of claim 16 further comprising providing a connection in communication with the regulator and passing through the enclosure to engage a welding gas cylinder external thereto.

20. The method of claim 16 further comprising extending at least one of a valve and a gauge attached to the regulator through the enclosure to allow operation and visual inspection, respectively, thereof.

21. A welding apparatus comprising:
an enclosure;
a power source constructed to output an electrical signal suitable to welding and disposed within the enclosure;
a shielding gas regulator disposed within the enclosure and fluidly connected to a first gas source via a gas path free of restriction therein;
wherein the first gas source is further defined as a gas cylinder, the gas cylinder connected to the shielding gas regulator and located at least partially within the enclosure; and
a second gas cylinder connected to the shielding gas regulator and outside the enclosure.

22. The welding apparatus of claim 21 wherein the second gas cylinder is connected to the shielding gas regulator by a quick connector.

23. A welding apparatus comprising:
an enclosure;
a power source constructed to output an electrical signal suitable to welding and disposed within the enclosure;
a shielding gas regulator disposed within the enclosure and fluidly connected to a first gas source via a gas path free of restriction therein; and
an electric valve downstream of the shielding gas regulator that allows on/off flow therethrough.

24. A welding apparatus comprising:
an enclosure;
a power source constructed to output an electrical signal suitable to welding and disposed within the enclosure;
a shielding gas regulator disposed within the enclosure; and
a valve and a gauge attached to the shielding gas regulator and accessible from outside the enclosure.

25. A welding apparatus comprising:
an enclosure;
a power source constructed to output an electrical signal suitable to welding and disposed within the enclosure;
a shielding gas regulator disposed within the enclosure; and
a valve attached to the shielding gas regulator and adjustable from within the enclosure.

* * * * *